United States Patent [19]

Holper

[11] 4,045,626

[45] Aug. 30, 1977

[54] CAM-OPERATED MOTOR CONTROL SWITCH ASSEMBLY WITH IMPROVED AUXILIARY ACTUATOR FOR MOTOR CONTROL MICROSWITCH

[75] Inventor: Frank Holper, Cary, Ill.

[73] Assignee: Original Equipment Motors, Crystal Lake, Ill.

[21] Appl. No.: 645,241

[22] Filed: Dec. 29, 1975

[51] Int. Cl.[2] ...................... H01H 43/12; H01H 3/20; H02P 3/00

[52] U.S. Cl. ............................ 200/30 R; 200/38 BA; 200/153 LB; 200/332; 318/466

[58] Field of Search ................. 200/27 B, 30 R, 31 R, 200/38 B, 38 BA, 38 C, 38 CA, 38 A, 38 F, 39 R, 153 L, 153 LB, 153 T, 321-323, 327, 332; 74/567-569; 318/466

[56] References Cited

U.S. PATENT DOCUMENTS

| | | | |
|---|---|---|---|
| 1,831,605 | 11/1931 | Porter | 200/38 F |
| 2,571,818 | 10/1951 | Blodgett | 200/332 X |
| 2,799,847 | 7/1957 | Harris | 200/38 A X |
| 2,847,525 | 8/1958 | Everard | 200/38 A |
| 3,190,976 | 6/1965 | Ellis et al. | 200/38 A |
| 3,248,956 | 5/1966 | Kuhn | 200/153 LB X |
| 3,424,876 | 1/1969 | Wiser et al. | 200/38 B |
| 3,670,128 | 6/1972 | Estrem | 200/153 LB |
| 3,712,966 | 1/1973 | Watts et al. | 74/569 X |
| 3,846,597 | 11/1974 | Ziegler, Jr. | 200/38 CA X |
| 3,980,937 | 9/1976 | Bostrom et al. | 318/466 |

*Primary Examiner*—James R. Scott
*Attorney, Agent, or Firm*—Kinar, Plyer, Dorn & McEachran

[57] ABSTRACT

An electric motor assembly for driving a helical feed screw for use in a vending machine. The helical feed screw is intermittently operated through cycles of similar duration and must be accurately positioned at the end of each cycle. Operation of the motor is initiated by the insertion of coins and is continued for the remainder of a cycle by a holding circuit. An actuating member for the holding circuit switch is positioned adjacent a cam which rotates with the helical feed screw. A pawl is positioned between and engages the switch actuating member and the cam. The cam has a notch indicating the end of the cycle which notch receives the pawl thereby allowing the switch actuating member to open the holding circuit and stop the motor. The pawl also has a dog which engages the edge of the cam notch to prevent reverse rotation of the cam at the end of the cycle. The pawl transmits cam forces to the switch actuating member only along the longitudinal axis thereof. The pawl and switch enclosure are mounted on a commmon mounting pin. The spring biasing the pawl and the switch enclosure are secured to the gear train housing by a common fastener.

1 Claim, 5 Drawing Figures

CAM-OPERATED MOTOR CONTROL SWITCH ASSEMBLY WITH IMPROVED AUXILIARY ACTUATOR FOR MOTOR CONTROL MICROSWITCH

SUMMARY OF THE INVENTION

This invention relates to a cyclically operable electric motor assembly and in particular to such an assembly which can be used to operate a helical feeder for a vending machine.

The present invention is disclosed principally in connection with small (sub-fraction horsepower) electric motors used in vending machines but the invention may be applied equally well to other purposes where the principle is applicable.

Certain kinds of vending machines employ a small electric motor to control delivery of the product. In one form of vending machine, packaged products are delivered by what amounts to a large helical (spring) feeder mounted on a shaft driven by a small electric motor. When proper coinage is inserted, a holding circuit is closed to energize the motor. The motor remains energized until the helical feeder has delivered the product. When delivery is completed, the motor is stopped by opening the holding circuit. Several functions are thus involved once the motor is energized. First, the motor is held energized for a duration of rotational movement predetermined as sufficient to complete delivery of the product. This may involve one turn of the helical feeder shaft, or only a fraction of a turn. Second, when delivery is completed, the motor must be stopped; finally, the helical feeder drive shaft must be accurately positioned for commencement of the next cycle, resisting any tendency for the helical spring to apply a reverse torque as a result of being tensioned during the delivery sequence. If the index position of the helical feeder shaft is not accurately held, the ultimate result is a malfunction of the vending machine, repeated pulsing of the motor for example.

These motors are small and invariably include a gear train (reduction) housing. In one prevailing form of motor assembly, some of the parts required to complete the functions mentioned above are located outside the gear train housing and some are located inside. As thus located, the cost of production is multiplied compared to an arrangement where the functions would be achieved by parts located entirely outside the gear train housing. Therefore, one object of the invention is to enable the three functions identified above to be achieved by parts located entirely outside the gear train housing, readily accessible for inspection and easily changed.

Motor assemblies as heretofore constructed for the purpose mentioned above incorporate a small, delicate switch having an operating finger operated directly by a cam. Because of the arrangement employed, the cam applied an unnecessary side thrust to the switch operating finger. This side thrust can account for reduced operating life of the switch compared to a straight-line force applied to the switch finger. A cam is also used in the present invention to operate the switch but side thrust against the switch operating finger is eliminated and this constitutes another object of the present invention.

It has been mentioned that a cam has heretofore been employed to control the actuating finger of an operating switch for a motor. The cam is located outside the gear housing, along with the switch. In the same known construction, one or more parts employed to hold or index the position of the output shaft of the motor assembly after a predetermined rotational arc has been traversed, are located inside the gear train housing. Thus, switch control and output shaft positioning parts are separated on an axis which extends through and outside the gear housing. Accordingly, it is another object of the present invention to enable the essential functions (switch closure, switch opening and shaft indexing) to be achieved by a pawl located between the switch actuating finger and a control cam configured to cooperate with the pawl.

Another object of the present invention is to simplify the manner in which the switch may be mounted and located and to employ the switch mounting means for locating the aforementioned pawl and a bias spring for the pawl.

BRIEF DESCRIPTION OF THE DRAWINGS

The invention is illustrated more or less diagrammatically in the following drawings wherein.

DESCRIPTION OF THE PREFERRED EMBODIMENT

Figure 1:
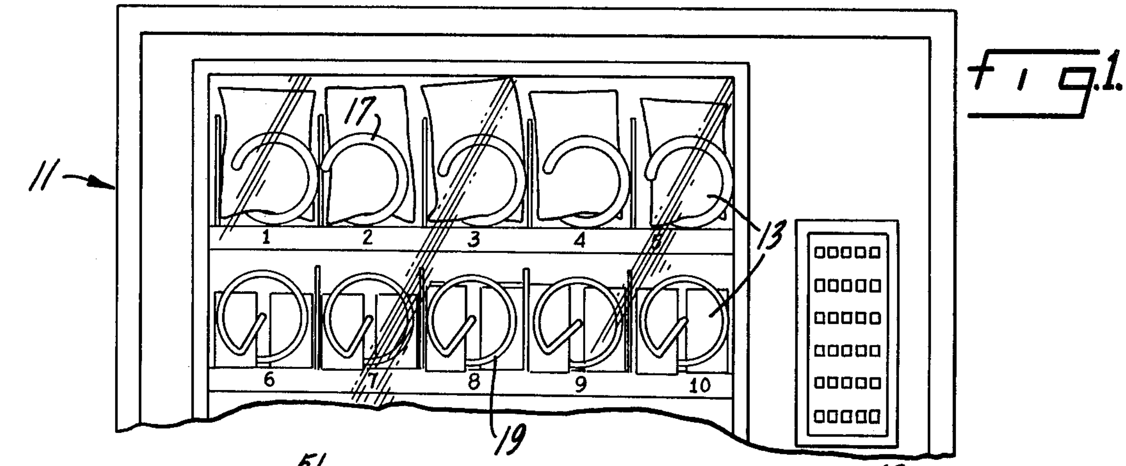
FIG. 1 is a partial front elevational view of a vending machine embodying the delivery mechanism of this invention.

FIG. 1 of the drawings shows a vending machine 11 which is operated by coins. The vending machine has a number of levels, only the top two of which are shown, with each level including rows of merchandise 13. The merchandise in each row is delivered by a helical feed screw. In the uppermost level of the machine, each helical feed screw 17 is of the type that requires a full revolution in order to deliver one item of merchandise 13. In the next level of the machine, each helical feed screw 19 is of the type that requires one half revolution to deliver an item of merchandise. Both types of feed screws can be operated by the electric motor assembly 21 of this invention which is shown in FIGS. 2 through 5 of the drawings.

The electric motor assembly 21 includes a stub shaft 23 which connects to the end of the helical feed screw 17 or 19 in any conventional manner. A circular hole 25 is provided in the stub shaft to receive a pin or other fastening means to attach the shaft to the helical feed screw. The opposite end of the stub shaft is splined to fit in a splined socket 27 formed in the output gear 29 of gear train 31. The gears of the gear train may be formed of a suitable plastic such as nylon. The opposite end of the output gear 29 has a cam surface 33 integrally formed thereon. The cam surface is circular and has at least one notch 35 of rectangular cross-section formed therein. When a full revolution feed screw 17 is used, only one notch is required. If a one-half revolution feed screw 19 is used, two notches are required with the notches located 180° apart. Sharp edges or teeth 37 are located at the circumferential edges of the notches. The tooth 37 at the edge of the notch located in the direction of rotation of the cam is especially important for reasons to be discussed later.

The gear train 31 is driven by a shaft 41 of the electric motor 43. The shaft 41 is mounted in a bearing 45 and another bearing (not shown) so as to permit axial movement of the shaft or solenoid action upon the establishment of a magnetic field when the motor is energized. In the normal or idle state of the motor, the shaft 41 is disengaged from the gear train 31 by a spring (which is not shown). A motor construction of this type is conventional and well known in the art. The electric motor 43 is conventionally of the shaded pole type but other sub-fractional electric motors including split-phase motors and capacitor motors may also be used within the teachings of this invention.

As is conventional, the motor 43 is actuated when the proper amount of coins are inserted in the coin slot of the vending machine. Depositing of the coins momentarily closes contacts in one leg of a holding circuit controlling the motor. The closing of these contacts completes a circuit between a source of power, which may be 110 volts AC, and the motor. Located in parallel in this circuit with the first contacts are holding switch contacts which are closed when the motor starts to rotate and which stay closed until the motor completes its pre-determined rotational cycle.

The holding switch contacts are located in a switch enclosure 51 which is mounted on the gear train housing 53. The novel mounting of this invention includes an opening 55 extending through one corner of the switch enclosure 51 which opening 55 receives a mounting pin 57 projecting from one side of the gear train housing 53. Also mounted on this side of the gear train housing 53 is a hairpin shaped spring 59 having a loop 61 which fits over a protuberance or knob 63 also formed on the side of the gear train housing. Extending through the knob 63 is a threaded opening (not shown) which is adapted to receive a fastener 67 which extends through one corner of the switch enclosure 51. Thus, the switch enclosure 51 is fastened to the gear train housing by the pin 57 located at one corner thereof and the threaded fastener 67 located at a diagonally opposite corner thereof.

The hairpin spring 59 biases a pawl 71 which is pivotally mounted on pin 57 and is positioned between the switch enclosure 51 and the gear train housing 53. Formed at the distal end of the pawl 71 is an upstanding portion 73 having a cam follower surface 75 on one side thereof and a notch 77 formed on adjacent side thereof. The notch 77 is shaped so that it can receive tooth 37 formed on cam surface 33 to enable the pawl 71 to also function as a dog to prevent reverse rotation or backlash of the cam. The switch for the holding switch contacts is controlled by elongated switch actuator 81 which extends out of the switch enclosure 51 and is biased by spring 83 against an actuator engaging surface 85 formed on the upstanding portion 73 of the pawl 71.

Figure 2:
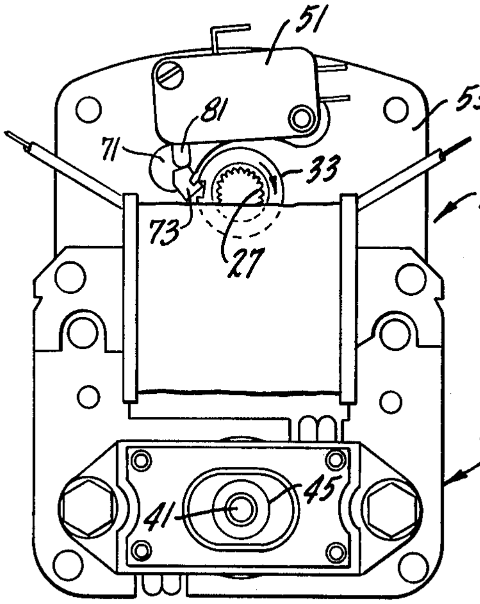
FIG. 2 is an end elevational view of the motor assembly of this invention.
Figure 3:
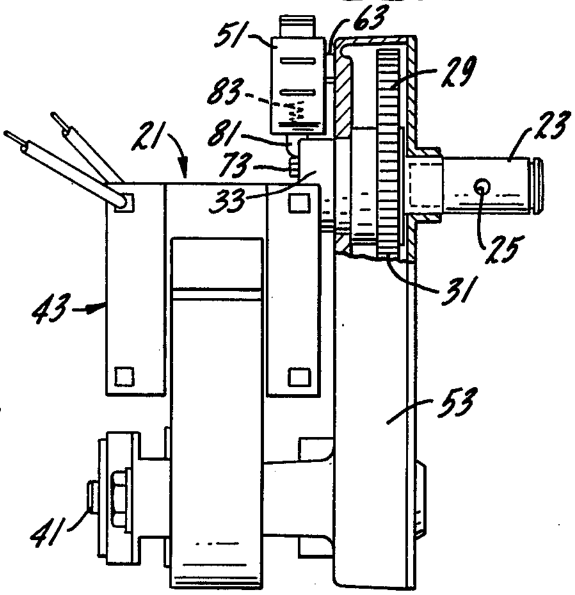
FIG. 3 is a side elevational view with parts broken away of the motor assembly of FIG. 2.
Figure 4:
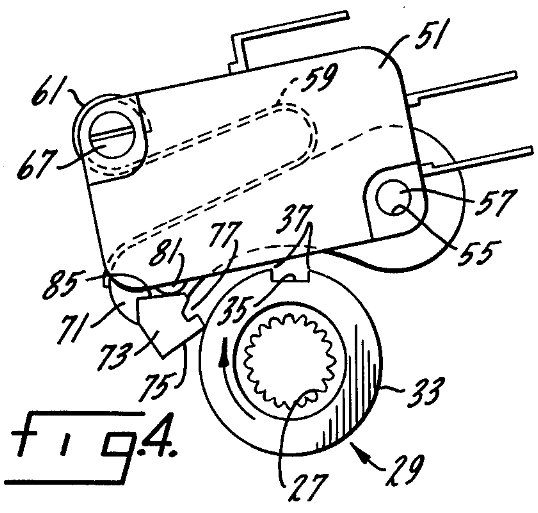
FIG. 4 is an enlarged end elevational view of the cam actuated switch mechanism shown in FIG. 2.
Figure 5:
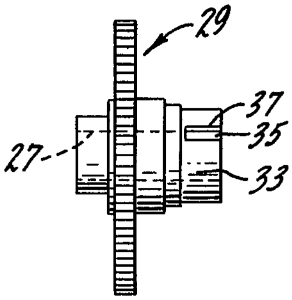
FIG. 5 is a side elevational view of a part taken from FIG. 3.

When the proper number of coins for a selected article of merchandise are installed in the vending machine 11, the contacts in one leg of the holding circuit will be closed and current will momentarily be supplied to the motor 43. The shaft 41 will move axially to the right, as shown in FIG. 3, where it meshes with a gear of the gear train 31. Rotation of the gear train rotates stub shaft 23 and cam surface 33 in a clockwise direction as shown in FIGS. 2 and 4. The cam surface 33 is positioned so that a tooth 37 at the edge of the notch 35 fits in dog notch 77 of the pawl 71.

Upon rotation of the stub shaft 23, the circular cam surface 33 engaging cam follower surface 75 of pawl 71, lifts the pawl out of the notch 35 and forces the elongated switch actuator member 81 into the switch enclosure 51. Inward movement of the switch actuator member closes the parallel leg of the motor holding circuit thus, insuring continued rotation of the motor 43 until the cam surface 33 completes approximately one full revolution. It should be understood that if the motor assembly were driving a half revolution feed screw 19, the cam surface 33 would have two notches 35 formed therein and located 180° apart so that the rotational movement of the feed screw would be 180°. When the cam surface 33 completes approximately 360° rotation, the upstanding portion 73 of the pawl 71 falls back into the notch 35 allowing the elongated switch actuator 81 biased by the spring 83 to open the motor holding circuit, thus stopping the motor. Backlash of the shaft 23, due to tensioning of the helical feed screw, is prevented since any backlash moves the tooth 37 of the cam surface 33 into the notch 77 of the pawl. Thus, the mechanism of this invention controls the operation of the motor 43 through a predetermined cycle of operation and accurately positions the shaft 31 at the end of each cycle. The pawl 71 is located on the exterior of the gear train housing for ease of assembly and maintainance. Manufacturing costs are also reduced since the pawl bias spring 50 and the switch enclosure 51 are supported on the gear train housing 53 by a common mounting pin 57 and a single threaded fastener 67. Because of the provision of a pawl between the cam surface and the switch actuator member, all forces applied by the cam are applied along the axis of the switch actuator member, thus eliminating any side thrust which would cause undue wear of the switch mechanism.

I claim:

1. An electric motor assembly in which the motor is intermittently operated through cycles of similar duration, in which an output shaft is connected to said motor through a gear train located in a housing, and in which a switch controlling a holding circuit for said motor is located in an enclosure, an actuating member for said switch movable between a holding circuit closing position and a holding circuit open position, said switch actuating member extending out of said switch enclosure, a cam synchronously rotatable with said shaft, said cam being contoured to permit said switch actuating member to move to the motor holding circuit open position when said shaft is at the end of each cycle and to move said actuating member to the motor holding circuit closed position during the remainder of said shaft cycle, a pawl pivotally mounted on a pin extending outwardly from said gear train housing with said pawl positioned to contact both said cam and said switch actuating member, said switch enclosure being mounted on said pin and being located outwardly of said pawl, and a U-shaped spring positioned between said gear housing and said switch enclosure, said spring engaging and biasing said pawl against said cam, said spring having a loop formed at the free end of one leg, a fastener extending through said switch enclosure and said loop to attach said switch enclosure and said spring to said gear train housing, the other leg of said U-shaped spring contacting said pawl.

* * * * *